(12) United States Patent
Shane et al.

(10) Patent No.: US 12,729,988 B2
(45) Date of Patent: Sep. 8, 2026

(54) DEPLOYING A RIGID INFLATABLE STRUCTURE

(71) Applicant: Boston Engineering Corporation, Waltham, MA (US)

(72) Inventors: David J. Shane, Woburn, MA (US); Michael Rufo, Hanover, MA (US); Todd Scrimgeour, North Hero, VT (US); Jonathan Osman, South Boston, MA (US)

(73) Assignee: BOSTON ENGINEERING CORPORATION, Waltham, MA (US)

( * ) Notice: Subject to any disclaimer, the term of this patent is extended or adjusted under 35 U.S.C. 154(b) by 198 days.

(21) Appl. No.: 18/735,773

(22) Filed: Jun. 6, 2024

(65) Prior Publication Data

US 2024/0410724 A1 Dec. 12, 2024

Related U.S. Application Data

(60) Provisional application No. 63/471,349, filed on Jun. 6, 2023.

(51) Int. Cl.

| | |
|---|---|
| ***G01D 11/30*** | (2006.01) |
| ***B63B 22/00*** | (2006.01) |
| ***B63B 22/22*** | (2006.01) |
| ***G01V 1/20*** | (2006.01) |
| ***G01V 1/38*** | (2006.01) |
| ***G10K 11/00*** | (2006.01) |

(52) U.S. Cl.

CPC ............. *G01D 11/30* (2013.01); *G01V 1/201* (2013.01); *B63B 22/003* (2013.01); *B63B 2022/006* (2013.01); *B63B 22/22* (2013.01); *G01V 1/3843* (2013.01); *G10K 11/008* (2013.01)

(58) Field of Classification Search

CPC ....... G01D 11/30; B63B 22/003; B63B 22/22; B63B 2022/006; G01V 1/201; G01V 1/3843; G10K 11/008

USPC .......................................................... 73/866.5

See application file for complete search history.

(56) References Cited

U.S. PATENT DOCUMENTS

| | | | | |
|---|---|---|---|---|
| 3,990,123 | A | 11/1976 | Stachiw et al. | |
| 2015/0117147 | A1* | 4/2015 | Hegge | G01V 1/16 367/15 |
| 2018/0321402 | A1* | 11/2018 | Mattsson | G01V 1/186 |

OTHER PUBLICATIONS

Office of Naval Research, Science & Tehnology, Final Technical Report from ONR Grant N000141812469, Performance Period from May 1, 2018 to Sep. 30, 2021, downloaded on Jun. 18, 2024, from https://apps.dtic.mil/sti/citations/AD1169163, 25 pages.

(Continued)

*Primary Examiner* — Peter J Macchiarolo
*Assistant Examiner* — John M Royston
(74) *Attorney, Agent, or Firm* — BainwoodHuang

(57) ABSTRACT

An underwater, expandable structure includes first and second helical coaxial tubes wound in opposite directions and bound together by a plurality of cords. The structure includes sensors placed on the structure at various locations, and relative spacing among the sensors remains stable once the tubes are inflated with water. The structure as well as assemblies and methodologies for deploying the structure are disclosed.

20 Claims, 4 Drawing Sheets

(56) References Cited

OTHER PUBLICATIONS

Xie, Liquan; et al., Bending Behavior of Inflatable Structures Filled With Hydrogel Beads, ScienceDirect, Powder Technology, vol. 404, May 2022, 117473, 7 pages.
Youtube video, https://www.youtube.com/watch?v=eidMDdMK38s, downloaded on Jul. 22, 2024, P3 Sunobuoy Deployment, 11 pages.

* cited by examiner

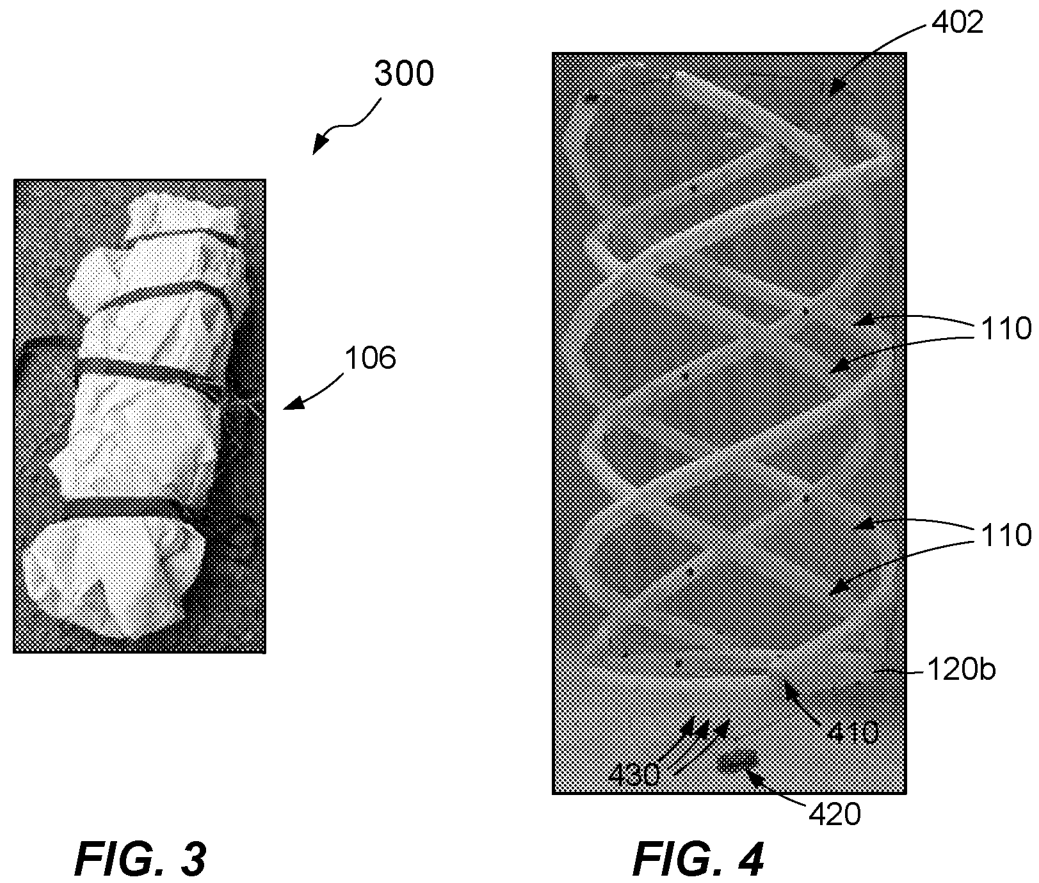
FIG. 3
FIG. 4
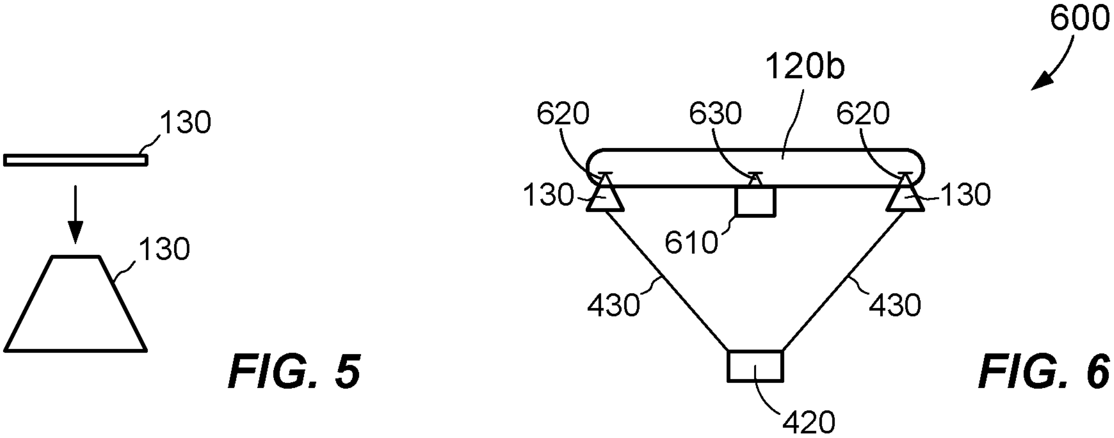
FIG. 5
FIG. 6

710
720
730
722
740
100
430
420

730
720
704
722
702
710
740
100
130
130
750
750
420

730
720
704
702
722
702
710
706
740
100a
100
100b
610
760
760
420

DEPLOYING A RIGID INFLATABLE STRUCTURE

CROSS-REFERENCE TO RELATED APPLICATIONS

This application claims the benefit of U.S. Provisional Patent Application No. 63/471,349, filed Jun. 6, 2023, the contents and teachings of which are incorporated by reference herein in their entirety.

STATEMENT REGARDING FEDERALLY SPONSORED RESEARCH OR DEVELOPMENT

This invention was made with government support under contract N68335-22-C-0336 awarded by the Office of Naval Research for the U.S. Navy. The government has certain rights in the invention.

BACKGROUND

Naval defense and other industries use acoustic sensing throughout the world's oceans to identify and track targets of interest. In one arrangement, a canister is dropped from an airplane. The canister enters a body of water and deploys a sensing apparatus, which opens under water like an umbrella. Hydrophones, i.e., underwater microphones, are placed on spokes or other surfaces of the apparatus. The hydrophones detect underwater sounds, and detections by hydrophones at different locations on the apparatus enable estimates of angle of arrival of the sounds.

Other arrangements include inflatable vertical columns, which elongate under water and house multiple hydrophones along their lengths. Some examples use single columns, whereas other examples use multiple, horizontally spaced-apart columns.

SUMMARY

Unfortunately, the above-described prior approaches are limited in their ability to identify angle of arrival of underwater sounds. For example, umbrella-like systems have hydrophones that span a large area, but all of the hydrophones are approximately on the same horizontal plane. The geometry of such systems allows good estimates of angle of arrival in X and Y dimensions, but not in the Z dimension (depth). Conversely, vertical columns of hydrophones provide good angle-of-arrival estimates in the Z dimension, but not in X and Y dimensions. Inflatable columns also lack rigidity and have a tendency to bend or twist along their lengths. Any geometrical changes in the columns introduce errors in angle-of-arrival measurements and thus degrade performance. What is needed, therefore, is a rigid and stable platform that has a shape extending in all three dimensions and is capable of housing underwater sensors for making accurate angle-of-arrival measurements.

The above need is addressed at least in part by an improved technique that provides an underwater, expandable structure including first and second helical coaxial tubes wound in opposite directions and bound together by a plurality of cords. The structure includes sensors placed on the structure at various locations, and relative spacing among the sensors remains stable once the tubes are inflated with water.

Advantageously, the oppositely-wound helices provide a stable, rigid structure that resists bending and torsion. The structure also has substantial length, width, and depth, enabling sensors to be placed on the structure in a manner that achieves accurate angle-of-arrival estimates in all spatial dimensions. Further, the structure can be packed into a small container and can expand my multiple orders of magnitude during deployment.

Certain embodiments are directed to an inflatable structure for holding sensors under water. The inflatable structure includes a plurality of coaxial helical tubes (CHTs), including a first helical tube wound in a clockwise direction and a second helical tube wound in a counterclockwise direction. The structure further includes a plurality of cords that bind together the plurality of CHTs and a plurality of sensors coupled to the plurality of CHTs and/or to the plurality of cords.

In some examples, the inflatable structure has a packed condition prior to submersion in water and a deployed condition after submersion in water. Also, the inflatable structure has a larger volume in the deployed condition than in the packed condition.

In some examples, the plurality of CHTs further includes a third helical tube wound in the clockwise direction and a fourth helical tube wound in the counterclockwise direction.

In some examples, the inflatable structure further includes an inflatable ring positioned at a top of the inflatable structure in the deployed condition, the inflatable ring having a continuous fluid connection with the plurality of CHTs.

In some examples, the inflatable structure further includes an inflatable ring positioned at a bottom of the inflatable structure in the deployed condition, the inflatable ring having a continuous fluid connection with the plurality of CHTs.

In some examples, the inflatable structure further includes one or more water inlets opening downwardly from a bottom of the inflatable structure and configured to channel water passively into the plurality of CHTs responsive to the inflatable structure being pulled down through water.

In some examples, said one or more water inlets are configured to (i) flatten in the packed condition and (ii) expand into flow-funneling shapes in the deployed condition.

In some examples, the structure further includes a pump constructed and arranged to pump water actively into the plurality of CHTs.

In some examples, the plurality of cords includes a set of longerons and a set of braces, wherein the set of longerons run vertically and the set of braces run diagonally in the deployed condition.

In some examples, the plurality of sensors includes a plurality of hydrophones.

Other embodiments are directed to a method of deploying a structure for holding sensors under water. The structure includes a plurality of coaxial helical tubes (CHTs), including a first helical tube wound in a clockwise direction and a second helical tube wound in a counterclockwise direction, a plurality of cords that bind together the plurality of CHTs, and a plurality of sensors coupled to the plurality of CHTs and/or to the plurality of cords. The method includes placing a delivery vessel into a body of water, the delivery vessel contains the structure in a packed condition. The structure has a top coupled to a float via a cable and a bottom coupled to a weight. The method further includes releasing the float to a surface of the water and releasing the weight to fall through the water, such that the weight extends the cable and pulls down on the structure. As the weight is falling through the water and pulling down on the structure, the method further includes passively filling the plurality of CHTs through a set of apertures.

In some examples, the method further includes pressurizing the plurality of CHTs by actively pumping water into the plurality of CHTs.

In some examples, pressurizing the plurality of CHTs is responsive to detecting that the structure has stopped falling through the water.

In some examples, pressurizing the plurality of CHTs includes closing the set of apertures.

In some examples, the set of apertures includes one or more inlets opening downwardly from the structure, and passively filling the plurality of CHTs with water includes admitting water into the plurality of CHTs through said one or more inlets.

In some examples, the weight is coupled to said one or more inlets, each of said one or more inlets are substantially flat in the packed condition, and the method further includes expanding said one or more inlets into flow-funneling shapes responsive to the weight pulling down.

In some examples, the structure further includes a plurality of hydrophones at predetermined locations on or within the structure, and the method further includes measuring underwater sounds by the plurality of hydrophones, conveying the measured sounds electronically through the cable to an antenna coupled to the float, and transmitting the measured sounds wirelessly to a receiving station.

Still further embodiments are directed to a delivery vessel that includes a float, a weight, and an expandable structure for holding sensors under water. The expandable structure has a top end coupled to the float via a cable and a bottom end coupled to the weight. The expandable structure includes a plurality of coaxial helical tubes (CHTs), including a first helical tube wound in a clockwise direction and a second helical tube wound in a counterclockwise direction. The expandable structure further includes a plurality of cords that bind together the plurality of CHTs and a plurality of sensors coupled to the plurality of CHTs and/or to the plurality of cords.

In some examples, the float, the weight, and the expandable structure are contained within the delivery vessel prior to deployment in water.

In some examples, the plurality of CHTs further includes a third helical tube wound in the clockwise direction and a fourth helical tube wound in the counterclockwise direction.

In some examples, the expandable structure further includes an inflatable ring positioned at the bottom end of the expandable structure, the inflatable ring having a continuous fluid connection with the plurality of CHTs.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

FIG. 3 is a perspective view of a prototype inflatable structure in a packed condition, according to certain embodiments.

FIG. 4 is a perspective view of the prototype inflatable structure of FIG. 3 in the deployed condition, according to certain embodiments.

FIG. 5 is a front, elevated view of an example inlet for conveying water passively into the inflatable structure, both in the packed condition (top) and in the deployed condition (bottom).

FIG. 6 is a front plan view of an example fill section of the inflatable structure.

DETAILED DESCRIPTION

Embodiments of the improved technique will now be described. One should appreciate that such embodiments are provided by way of example to illustrate certain features and principles but are not intended to be limiting.

An improved technique provides an underwater, expandable structure that includes first and second helical coaxial tubes wound in opposite directions and bound together by a plurality of cords. The structure includes sensors placed on the structure at various locations, and relative spacing among the sensors remains stable once the tubes are inflated with water.

Figure 1:
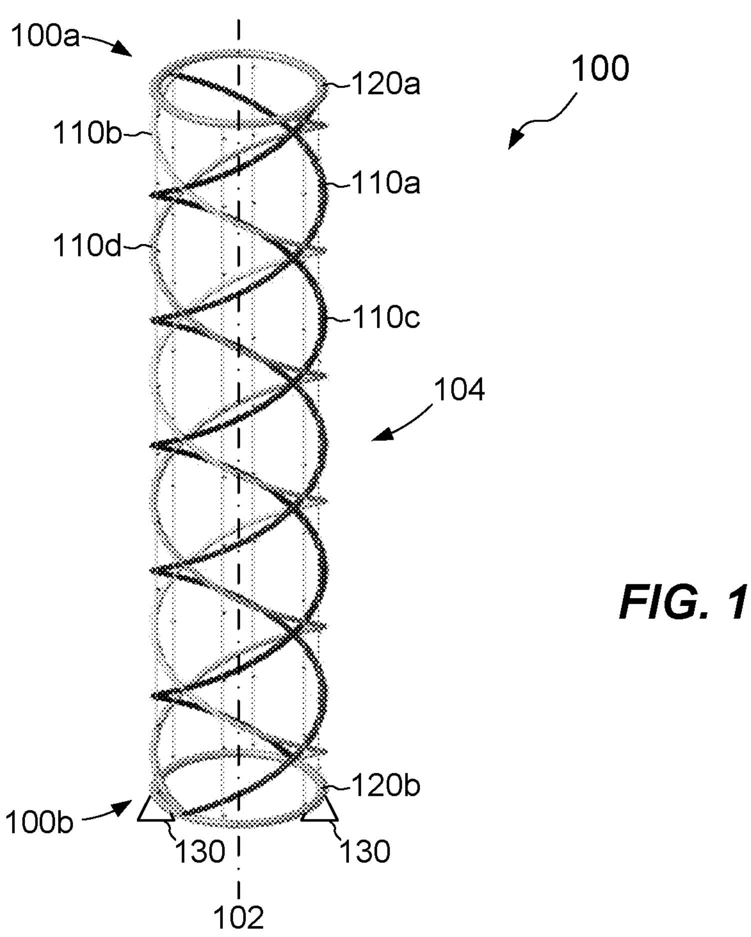
FIG. 1 is a front perspective view of an example inflatable structure in a deployed condition, according to certain embodiments.

FIG. 1 shows an example expandable structure 100 in a deployed condition 104 according to certain embodiments. Here, the structure 100 includes multiple coaxial helical tubes (CHTs) 110. The CHTs 110 are wound around a common axis 102. A first CHT 110*a* is wound in a clockwise direction (e.g., when viewed from a top 100*a* of the structure 100), and a second CHT 110*b* is wound in a counterclockwise direction (also when viewed from the top). Similarly, a third CHT 110*c* is wound clockwise and a fourth CHT 110*d* is wound counterclockwise. Although not required, the structure 100 generally includes an even number of CHTs 110 (e.g., 2, 4, 6, etc.), with one half of them wound clockwise and the other half wound counterclockwise.

In an example, which is not intended to be limiting, the structure 100 also includes a top (upper) inflatable ring 120*a* at the top 100*a* of the structure 100 and/or a bottom (lower) inflatable ring 120*b* at a bottom 100*b* of the structure 100. The top and bottom rings 120*a* and 120*b* are preferably coaxial with the CHTs, i.e., the axis 102 approximately intersects the centers of the rings 120*a* and 120*b*. Also, each of the rings 120*a* and 120*b* preferably has a continuous fluid connection with each of the CHTs 110. For example, the top end of each CHT 110 opens into the top ring 120*a* such that water can freely flow between the top ring 120*a* and each of the CHTs 110. Likewise, the bottom end of each CHT 110 opens into the bottom ring 120*b* such that water can freely flow between the bottom ring 120*b* and each of the CHTs 110. The continuous fluid connections ensure that water pressure in all of the CHTs 110 is the same.

In an example, the CHTs 110 and the rings 120*a* and 120*b* are made of a water-impermeable material that is pliable yet inelastic, such as treated fabric. This material allows the CHTs and rings to be packed into a small volume when uninflated but also to achieve a stable size when inflated with water. The CHTs and the rings may be bound together by stitching or ultrasonic welding, for example. Joints between the CHTs and the rings are sealed to avoid leaks.

In some examples, apertures 130 are provided at the bottom 100*b* of the structure 100. The apertures 130 allow water to enter the structure 100 during deployment and to fill the CHTs and the rings with water, such that the structure 100 expands from a packed condition 106 (FIG. 3) to the deployed condition 104. The volume of the structure 100 in the deployed condition 104 is typically much greater than the volume of the structure in the packed condition 106, such as 2,000 times or more greater. In some examples, the apertures 130 take the form of downwardly-opening inlets. As will be described, a weight pulls down on the structure 100 during deployment. As the structure 100 is descending, water passively enters the structure through the inlets, expanding the structure to nearly its fully-deployed dimensions.

Figure 2:
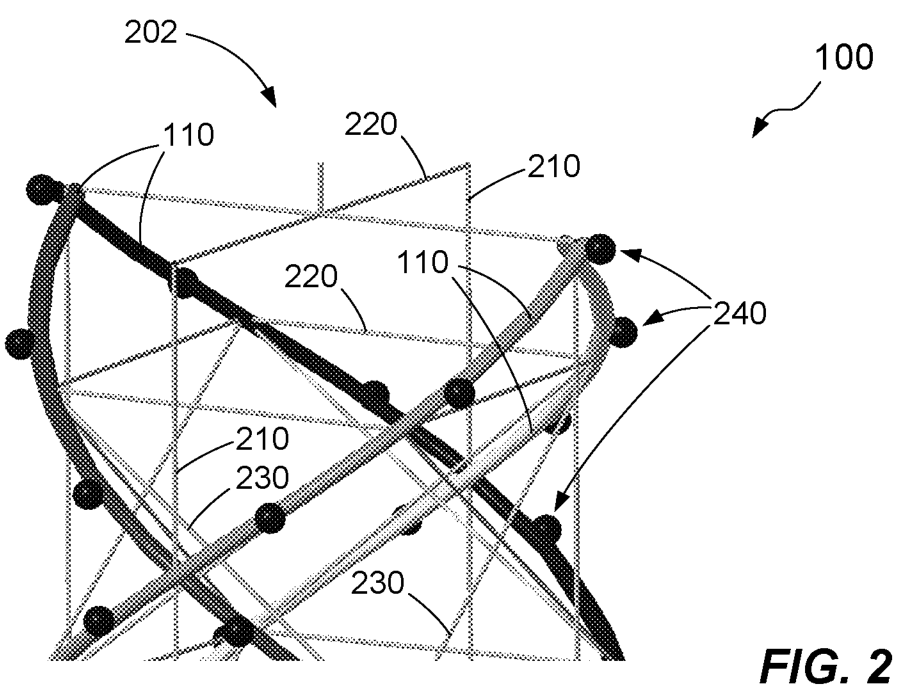
FIG. 2 is a magnified perspective view of a portion of the inflatable structure of FIG. 1, according to certain embodiments.

FIG. 2 shows additional features of the structure 100. Here, it is seen that the CHTs 110 are bound together by cords 202, which broadly can be classified as longerons 210, battens 220, and braces 230. The longerons 210 run vertically from the top 100*a* of the structure to the bottom 100*b* and thus limit the maximum length that the structure 100 can attain when inflated with water. The battens 220 run horizontally, and the braces 230 run diagonally. Each batten 220 and each brace 230 typically runs between a respective pair of CHTs. Taken together, the longerons 210, battens 220, and braces 230 (cords 202) stabilize the structure 100 in all dimensions, maintaining the helical shapes of the CHTs 110 as well as their placements and angular offsets relative to one another. In an example, the cords 202 are composed of a pliable, inelastic fiber, such as Kevlar®.

In some examples, the structure 100 is further stabilized by direct connections between CHTs 110. For example, different CHTs 110 in the deployed condition 104 naturally make contact at various locations along the structure's length. The CHTs may be fastened together at these contact points, e.g., using stitching or ultrasonic bonding. Preferably, only a short bond, such as a single stitch, is provided, such that the CHTs 110 retain some ability to pivot relative to each other at the contact points, thus avoiding stress when the structure 100 is packed or when it transitions from the packed condition 106 to the deployed condition 104.

The provision of opposingly-wound CHTs 110 stabilizes the structure against bending and torsion, promoting rigidity. In addition, the CHTs 110 and the cords 202 provide ample and diverse locations at which sensors 240 can be mounted.

The sensors 240 may include hydrophones and/or other types of sensors, such as cameras, accelerometers, magnetometers, and CTD (conductivity, temperature, and depth) sensors. In some examples, some or all of the sensors 240 are attached to the outsides of the CHTs 110, and electrical wiring for the sensors 240 may run along the outsides of the CHTs 110 and/or along the cords 202. In other examples, some or all of the sensors 240 are attached internally to the CHTs 110. Wiring to the sensors 240 may be contained partially or entirely within the CHTs 110, thus reducing a risk that the wiring becomes tangled or caught during deployment. In some examples, wiring is run internally to the CHTs even if the sensors themselves are attached externally. The sensors 240 may be sewn, ultrasonically welded, or otherwise fastened in place, such that their locations relative to the structure 100 are fixed and determined by design.

FIG. 3 shows an example prototype 300 of the expandable structure 100 in the packed condition 106. Here, the CHTs and the bottom ring are empty of water (the prototype does not include a top ring 120*a*), such that the entire structure 100 can collapse down to a compact size, such as 20 cm by 8 cm. The same structure can expand to a size of 2.5 m tall by 1.3 m wide (FIG. 4). The straps shown in FIG. 3 would normally be omitted from the finished product and are shown merely to demonstrate the compactness of the uninflated structure.

FIG. 4 shows the same prototype 300 in the deployed condition 104. The prototype 300 includes four CHTs 110, two of which run clockwise and two of which run counterclockwise. A bottom ring 120*b* is provided, but the top ring has been replaced by a spacer 402 (a top ring rather than the spacer would normally be included in the finished product). The bottom ring 120*b* forms a continuous fluid connection 410 with each of the CHTs 110. Also, a weight 420 pulls down on the structure 100 via connecting lines 430, which run between the weight 420 and the bottom ring 120*b*.

One should appreciate that the dimensions of the structure 100 can be varied based on mission requirements. Non-limiting examples of deployed sizes include 25 feet (7.62 meters) long by 5 feet (1.52 meters) wide and 5 feet (1.52 meters) long by 37 inches (94 cm) wide. In an example, the number of turns made by each CHT 110 depends on the width of the deployed structure, with each turn extending over a distance that is approximately 2-3 times the width. Preferably, the packed structure fits within a standard A-size payload, which is 18 inches (45.72 cm) by 5 inches (12.7 cm).

The number of CHTs 110 may also be varied, with larger numbers of CHTs providing greater rigidity and more locations for mounting sensors 240, but also larger packed sizes and thus lower expansion ratios.

FIG. 5 shows an example of an inlet 130 in additional detail. Here, the inlet 130 may initially be flat (top of FIG. 5), when the structure 100 is in the packed condition but may expand to assume a flow-funneling shape when the structure 100 transitions to the deployed condition (bottom of FIG. 5). For example, the inlet 130 may be composed of fabric, such as the same treated fabric that is used for the CHTs 110 and the rings 120*a* and 120*b*. When expanded, the fabric assumes a flow-funneling shape, such as that of a cone, having an inner (upper) circumference sewn or otherwise attached to the bottom ring 120*b* and an outer (lower) circumference that extends downwardly during deployment. For example, the outer circumference of each inlet 130 may be attached via one or more connecting lines 430 to the weight 420, such that the weight 420 pulls the inlet 130 open during deployment, causing it to assume the flow-funneling shape. As an alternative to fabric, nested concentric rings may be used (e.g., plastic rings), with the innermost ring connected to the bottom inflatable ring 120*b* and the outermost ring connected to the weight. During deployment, the outermost ring is pulled down, such that the concentric rings expand into the flow-funneling shape. These are merely examples.

FIG. 6 shows an example fill section 600 of the expandable structure 100. Here, the fill section 600 includes the bottom inflatable ring 120*b* with one or more inlets 130 extending downwardly. In an example, the inlets 130 connect to the weight 420 via connecting lines 430. Additionally or alternatively, connecting lines 430 may connect the weight 420 to other portions of the bottom ring 120*b*. The fill section 600 further includes a pump 610. A battery (not shown) for operating the pump 610 may be provided adjacent to the pump 610, as part of the weight 420, or in some other portion of the assembly. The pump 610 is preferably only a few centimeters in each dimension and is optimized for high pressure, but not necessarily for high flow.

In an example, each of the inlets 130 has an associated valve 620, which controls the flow of water through the respective inlet. For example, each valve 620 is constructed and arranged to remain open while the structure 100 is passively filling with water (e.g., during descent), and to close once passive filling is complete (e.g., after descent). The pump 610 may have its own valve 630, which is constructed and arranged to open during active filling and to close at other times. In some examples, which are not intended to be limiting, the valves 620 and 630 are implemented as passive check valves, which allow water to flow into the structure 100 but not to exit the structure.

Figures 7A, 7B, 7C:
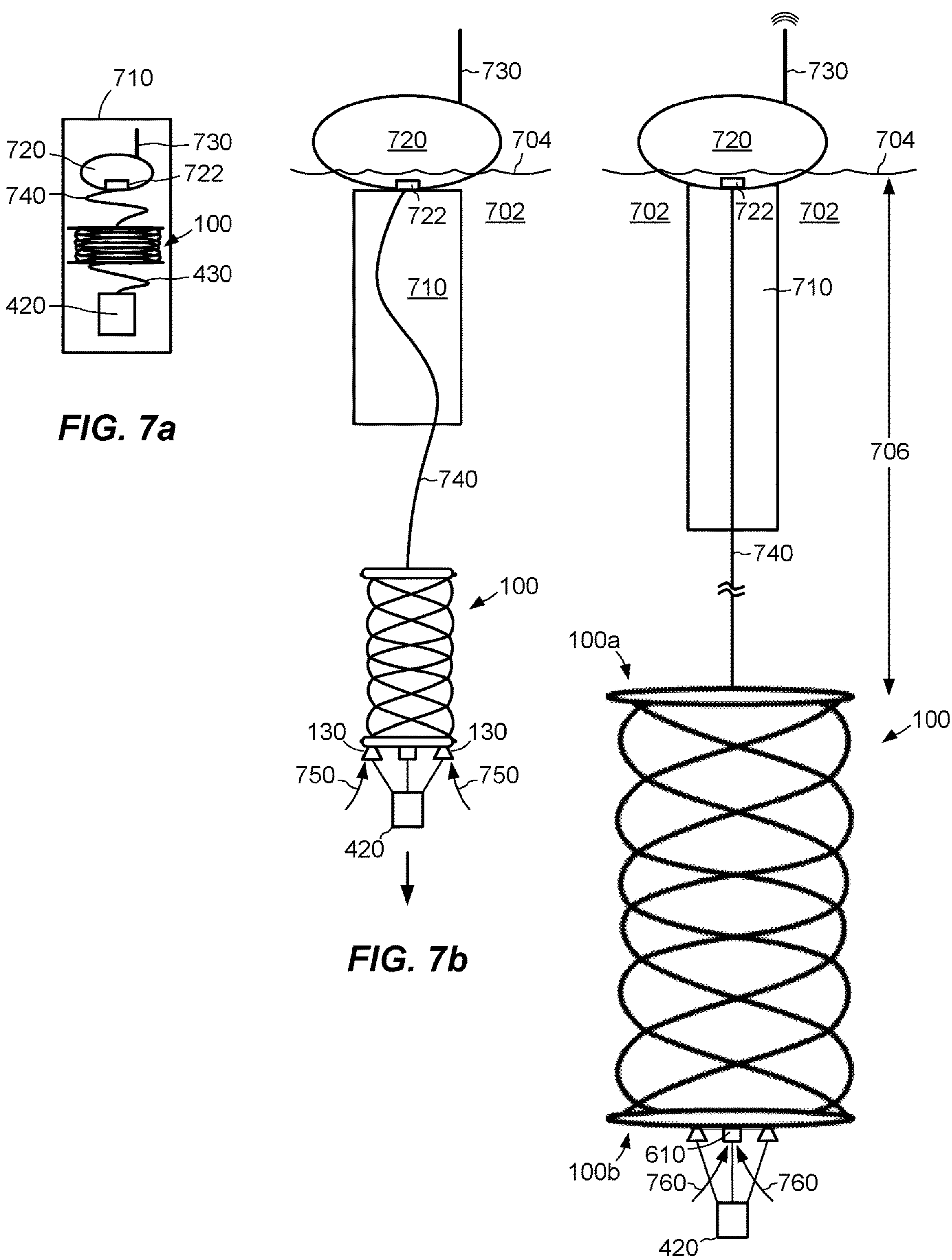
FIGS. 7*a*, 7*b*, and 7*c* are front views of an example sequence for deploying the inflatable structure, according to certain embodiments.

FIGS. 7*a*, 7*b*, and 7*c* show an example deployment sequence of the structure 100. As shown in FIG. 7*a*, the structure 100 is provided in the packed condition 106 as part of a delivery vessel 710, which also includes a float 730 and the above-described weight 420. The float may be a foam float (e.g., Styrofoam) or an inflatable float, which is configured to inflate automatically upon contact with water. A cable 740 is connected between the top end 100*a* of the structure 100 (e.g., the top ring 120*a*) and the float 720. One or more lines 430 are connected between the bottom end 100*b* of the structure (e.g., the bottom ring 120*b*) and the weight 420. The float 720 includes or connects to an antenna 730, e.g., for supporting wireless communications with a remote base station. The antenna 730 is operatively coupled to an electronics module 722, which may include a transmitter as well as other electronic circuitry, such as an electronic controller. In an example, the cable 720 is realized as a wave motion limiting payload connection, which provides both a mechanical connection and an electrical connection between the float 720 and the structure 100. For example, the cable 740 has a length that determines a depth 706 of the structure 100 once it is deployed, and hydrophones and/or other sensors of the structure 100 connect to the electronics module 722 via the cable 420.

The delivery vessel 710 is designed for deployment in a body of water 702. For example, the delivery vessel 710 may be dropped from an airplane or dropped overboard from a ship at sea. It may be connected to a buoy or a dock. When configured for airplane deployment, the delivery vessel 710 may further include a parachute (not shown), which limits the speed at which the delivery vessel 710 falls through the air.

As shown in FIG. 7*b*, the delivery vessel 710 is constructed and arranged to release both the float 720 and the structure 100 upon contact with the body of water 702. For example, one or more springs (not shown) may push the float 720 upward and the structure 100 downward. One or more dissolving bobbins may hold back the force of the spring(s) until the vessel 710 is submerged in water, at which point the bobbin(s) dissolve and the components separate. The float 720 remains at a surface 704 of the water 702, while the weight 420 begins to descend under the influence of gravity, pulling down the structure 100. For this initial descent, we assume that the inlet valves 630 are open and that the pump valve 630 is closed.

As the weight 420 pulls down on the structure 100, the structure 100 elongates and water passively enters the structure 100 through the inlets 130 (arrows 750). When the cable 740 is completely extended, the structure 100 stops descending. At this point, the structure 100 is about 70-90% filled with water. At this point, the inlet valves 620 close and the pump valve 630 opens.

As shown in FIG. 7*c*, the structure 100 has stopped descending and the pump 610 has turned on, actively pumping water into the structure 100. As the structure 100 was mostly filled passively (FIG. 7*b*), it is necessary for the pump 610 to move only a small amount of water and to pressurize the water inside the structure 100. As the pump 610 operates, the structure 100 becomes increasingly rigid and assumes its designed dimensions and physical characteristics. A target water pressure within the structure 100 may be 15 psi (103 kPa) above the ambient water pressure, for example. The pump 610 may then turn off (or its battery may be allowed to run down), and the pump valve 630 may close. The structure 100 is then ready for sensing operations. For example, hydrophones on or within the structure 100 may begin measuring sounds in the environment and sending the measured sounds up the cable 740 to the electronics module 722, which then may transmit the measured sounds to a remote base station via the antenna 730.

Preferably, the pump 610 turns on only after the structure 100 has stopped descending. For example, the structure 100 detects that it is no longer descending through the water 702 and turns on the pump 610 responsive to that detection. Such detection may be based on readings from a pressure sensor, for example, which increase as the structure 100 is descending but stabilize once the structure 100 stops descending.

Figure 8:
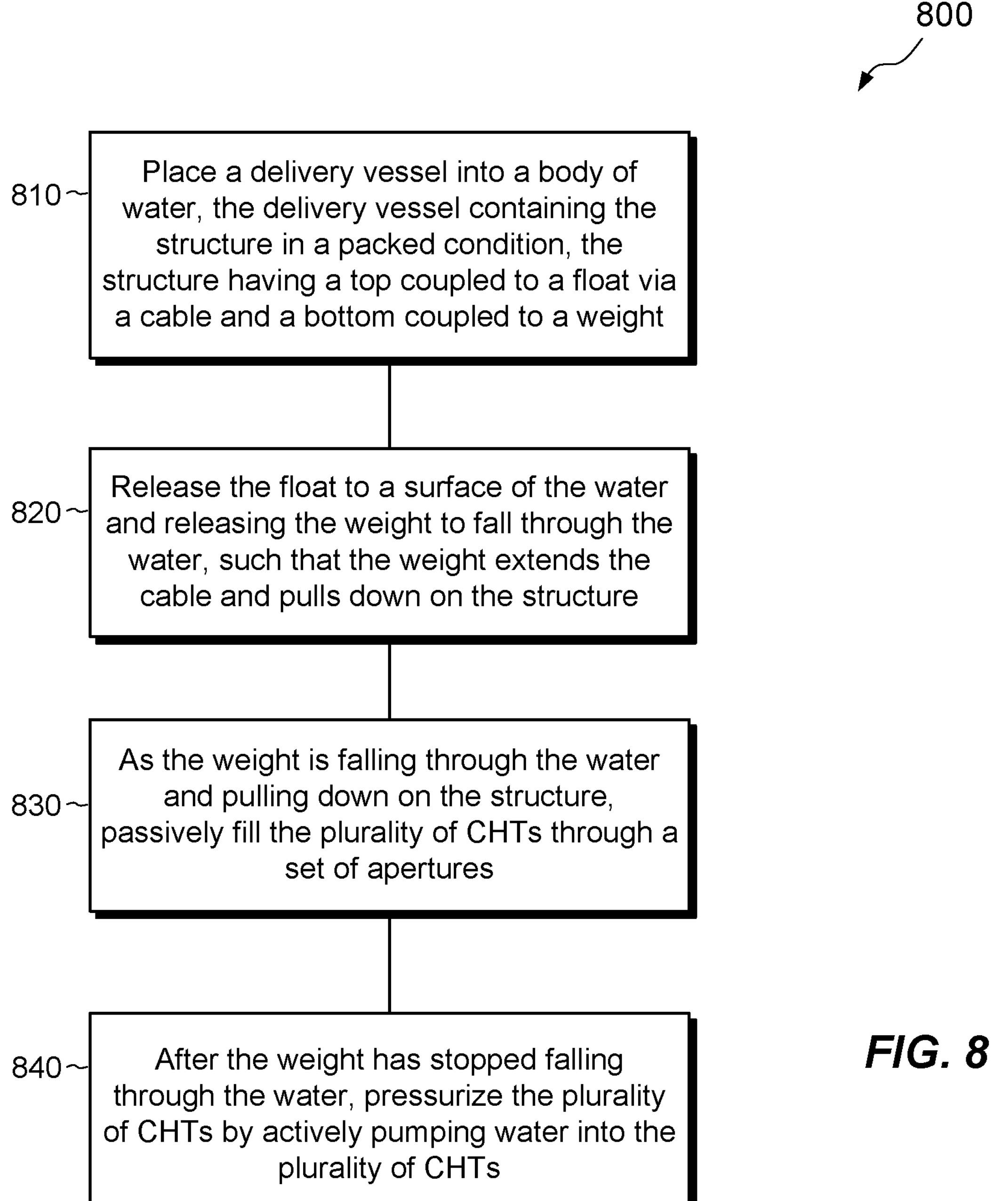
FIG. 8 is a flowchart showing an example method of deploying a structure for holding sensors under water, according to certain embodiments.

FIG. 8 shows an example method 800 of deploying a structure for holding sensors under water. The method 800 may be carried out, for example, in the environment of FIGS. 7*a* through 7*c*. The various acts of method 800 may be ordered in any suitable way. Accordingly, embodiments may be constructed in which acts are performed in orders different from that illustrated, which may include performing some acts simultaneously.

At 810, a delivery vessel 710 is placed into a body of water 702. The delivery vessel 710 contains an expandable structure 100 in the packed condition 106, e.g., within a standard A-size payload. A float 720 is coupled to a top end of the structure 100 via a cable 740, and a weight 420 is coupled to a bottom end of the structure 100, e.g., via connecting lines 430.

At 820, the float 720 is released to the surface 704 of the water 702 and the weight 420 is allowed to fall through the water 702. The weight 420 pulls down on the structure 100, elongating the structure and extending the cable 740.

At 830, the weight 420 falls through the water and pulls down on the structure 100, passively filling the CHTs through a set of apertures, such as inlets 130.

At 840, the weight 420 stops falling through the water 702 and the pump 610 turns on, pressurizing the CHTs by actively pumping water into them. The pump 610 may turn off automatically once a desired pressure within the structure 100 is achieved, or the pump 610 may continue operating until its battery is run down. The sensors 240 may then begin measuring, and the structure 100 may transmit the measurements wirelessly to a base station via the antenna 730. In some examples, the pump 610 may turn on intermittently over time to repressurize the structure 100.

An improved technique has been described that provides an underwater, expandable structure 100 including first and second helical coaxial tubes 110 wound in opposite directions and bound together by a plurality of cords 202. The structure 100 includes sensors 240 placed on the structure 100 at various locations, and relative spacing among the sensors 240 remains stable once the tubes 100 are inflated with water.

Advantageously, the oppositely-wound CHTs 110 provide a stable, rigid structure that resists bending and torsion. The structure 100 also has substantial length, width, and depth, enabling sensors 240 to be placed on the structure in a manner that achieves accurate angle-of-arrival estimates in all spatial dimensions. Further, the structure can be packed into a small container and can expand substantially during deployment. The structure is also acoustically quiet and transparent.

Having described certain embodiments, numerous alternative embodiments or variations can be made. For example, although the described embodiments use both passive and active filling of water to achieve desired rigidity, passive filling alone may be sufficient for alternative embodiments. Further, although deployment of a single structure 100 is described, alternative deployments may involve deployment of multiple structures that work together, such as multiple structures arranged in series (vertically) or in parallel (horizontally).

In addition, embodiments may be constructed in which the structure 100 is used in terrestrial or airborne applications, in which the CHTs and rings are inflated with air rather than water. Indeed, the CHTs and rings may be inflated with any fluid, whether it be water, air, or some other fluid.

Further, although the illustrated embodiments are provided for carrying sensors, alternative embodiments do not require sensors. Rather, the disclosed structure 100 may be used for carrying equipment of any kind.

Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words “comprising,” “including,” “containing,” and “having” are intended to set forth certain items, steps, elements, or aspects of something in an open-ended fashion. Also, as used herein and unless a specific statement is made to the contrary, the word “set” means one or more of something. This is the case regardless of whether the phrase “set of” is followed by a singular or plural object and regardless of whether it is conjugated with a singular or plural verb. Also, a “set of” elements can describe fewer than all elements present. Thus, there may be additional elements of the same kind that are not part of the set. Further, ordinal expressions, such as “first,” “second,” “third,” and so on, may be used as adjectives herein for identification purposes. Unless specifically indicated, these ordinal expressions are not intended to imply any ordering or sequence. Thus, for example, a “second” event may take place before or after a “first event,” or even if no first event ever occurs. In addition, an identification herein of a particular element, feature, or act as being a “first” such element, feature, or act should not be construed as requiring that there must also be a “second” or other such element, feature or act. Rather, the “first” item may be the only one. Also, and unless specifically stated to the contrary, “based on” is intended to be nonexclusive. Thus, “based on” should be interpreted as meaning “based at least in part on” unless specifically indicated otherwise. Further, although the term “user” as used herein may refer to a human being, the term is also intended to cover non-human entities, such as robots, bots, and other computer-implemented programs and technologies. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. An inflatable structure for holding sensors under water, comprising:
- a plurality of coaxial helical tubes (CHTs), including a first helical tube wound in a clockwise direction and a second helical tube wound in a counterclockwise direction;
- a plurality of cords that bind together the plurality of CHTs; and
- a plurality of sensors coupled to the plurality of CHTs and/or to the plurality of cords.

2. The inflatable structure of claim 1, having a packed condition prior to submersion in water and a deployed condition after submersion in water, the inflatable structure having a larger volume in the deployed condition than in the packed condition.

3. The inflatable structure of claim 2, wherein the plurality of CHTs further includes a third helical tube wound in the clockwise direction and a fourth helical tube wound in the counterclockwise direction.

4. The inflatable structure of claim 3, further comprising an inflatable ring positioned at a top of the inflatable structure in the deployed condition, the inflatable ring having a continuous fluid connection with the plurality of CHTs.

5. The inflatable structure of claim 3, further comprising an inflatable ring positioned at a bottom of the inflatable structure in the deployed condition, the inflatable ring having a continuous fluid connection with the plurality of CHTs.

6. The inflatable structure of claim 3, further comprising one or more water inlets opening downwardly from a bottom of the inflatable structure and configured to channel water passively into the plurality of CHTs responsive to the inflatable structure being pulled down through water.

7. The inflatable structure of claim 6, wherein said one or more water inlets are configured to (i) flatten in the packed condition and (ii) expand into flow-funneling shapes in the deployed condition.

8. The inflatable structure of claim 6, further comprising a pump constructed and arranged to pump water actively into the plurality of CHTs.

9. The inflatable structure of claim 2, wherein the plurality of cords includes a set of longerons and a set of braces, wherein the set of longerons run vertically and the set of braces run diagonally in the deployed condition.

10. The inflatable structure of claim 2, wherein the plurality of sensors includes a plurality of hydrophones.

11. A method of deploying a structure for holding sensors under water, the structure including:
- a plurality of coaxial helical tubes (CHTs), including a first helical tube wound in a clockwise direction and a second helical tube wound in a counterclockwise direction;
- a plurality of cords that bind together the plurality of CHTs; and
- a plurality of sensors coupled to the plurality of CHTs and/or to the plurality of cords, the method comprising:
- placing a delivery vessel into a body of water, the delivery vessel containing the structure in a packed condition, the structure having a top coupled to a float via a cable and a bottom coupled to a weight;

releasing the float to a surface of the water and releasing the weight to fall through the water, such that the weight extends the cable and pulls down on the structure; and as the weight is falling through the water and pulling down on the structure, passively filling the plurality of CHTs through a set of apertures.

12. The method of claim 11, further comprising pressurizing the plurality of CHTs by actively pumping water into the plurality of CHTs.

13. The method of claim 12, wherein pressurizing the plurality of CHTs is responsive to detecting that the structure has stopped falling through the water.

14. The method of claim 12, wherein pressurizing the plurality of CHTs includes closing the set of apertures.

15. The method of claim 11, wherein the set of apertures includes one or more inlets opening downwardly from the structure, and wherein passively filling the plurality of CHTs with water includes admitting water into the plurality of CHTs through said one or more inlets.

16. The method of claim 11, wherein the structure further includes a plurality of hydrophones at predetermined locations on or within the structure, and wherein the method further comprises:

measuring underwater sounds by the plurality of hydrophones;

conveying the measured sounds electronically through the cable to an antenna coupled to the float; and transmitting the measured sounds wirelessly to a receiving station.

17. A delivery vessel, comprising:

a float;

a weight; and an expandable structure for holding sensors under water, the expandable structure having a top end coupled to the float via a cable and a bottom end coupled to the weight, the expandable structure including:

a plurality of coaxial helical tubes (CHTs), including a first helical tube wound in a clockwise direction and a second helical tube wound in a counterclockwise direction;

a plurality of cords that bind together the plurality of CHTs; and a plurality of sensors coupled to the plurality of CHTs and/or to the plurality of cords.

18. The delivery vessel of claim 17, wherein the float, the weight, and the expandable structure are contained within the delivery vessel prior to deployment in water.

19. The delivery vessel of claim 17, wherein the plurality of CHTs further includes a third helical tube wound in the clockwise direction and a fourth helical tube wound in the counterclockwise direction.

20. The delivery vessel of claim 17, wherein the expandable structure further includes an inflatable ring positioned at the bottom end of the expandable structure, the inflatable ring having a continuous fluid connection with the plurality of CHTs.

* * * * *